Dec. 23, 1952 H. S. OGDEN 2,622,411
ICE-CREAM MAKING MACHINE
Filed June 12, 1950 7 Sheets-Sheet 1

INVENTOR.
HUBERT S. OGDEN
By Earl E. Moore
ATTY.

Dec. 23, 1952  H. S. OGDEN  2,622,411
ICE-CREAM MAKING MACHINE
Filed June 12, 1950  7 Sheets-Sheet 4

INVENTOR.
HUBERT S. OGDEN
BY
Earl E. Moore
ATTY.

Dec. 23, 1952  H. S. OGDEN  2,622,411
ICE-CREAM MAKING MACHINE
Filed June 12, 1950  7 Sheets-Sheet 5

INVENTOR,
HUBERT S. OGDEN
By Earl E. Moore
ATTY.

Dec. 23, 1952 H. S. OGDEN 2,622,411
ICE-CREAM MAKING MACHINE
Filed June 12, 1950 7 Sheets-Sheet 7

INVENTOR.
HUBERT S. OGDEN
BY
Earl E. Moore
Atty.

Patented Dec. 23, 1952

2,622,411

UNITED STATES PATENT OFFICE 2,622,411

ICE-CREAM MAKING MACHINE

Hubert S. Ogden, Los Angeles, Calif., assignor to New Process Confection and Beverage Corporation, Dallas, Tex., a corporation of Texas Application June 12, 1950, Serial No. 167,684

2 Claims. (Cl. 62—114)

This invention belongs to that general class of devices known as freezers and relates particularly to the means and art of making frozen and semi-frozen foods, malts, ice cream etc. The invention has among its objects the production of a means of the described that is simple, durable and compact in structure, inexpensive to make and manufacture, dependable and efficient in use and service, and convenient for quick and easy production of frozen delicacies; and a device that is well housed which is pleasing and attractive in appearances and very satisfactory for use whenever and wherever found applicable.

One of the principal objects is to produce a light and satisfying ice cream, malt drinks, or semi-frozen liquid from a pre-made non-frozen food mix and the like, that is, containers of the proper cream, milk and water mixes and flavors are prepared and preserved and ready for instant use in a freezing unit, thus making possible to freeze and dispense a frozen or semi-frozen delicacy in short order into a suitable container for immediate consumption.

Other objects, advantages and features of this particular invention will appear from a careful perusal of the accompanying drawings, the subjoined detailed description, the preamble of these specifications, and the claims appended hereto.

Below, applicant describes one of the preferable forms of his invention in order to teach the art thereof and show how to make and use the same, but it is to be understood that the drawings and description thereof are not to limit the invention in any sense whatsoever except as the same may be limited by the prior art. Language employed herein is not to be construed as giving any unauthorized person or organization the right to make, use and/or sell the invention herein disclosed.

Figure 1:
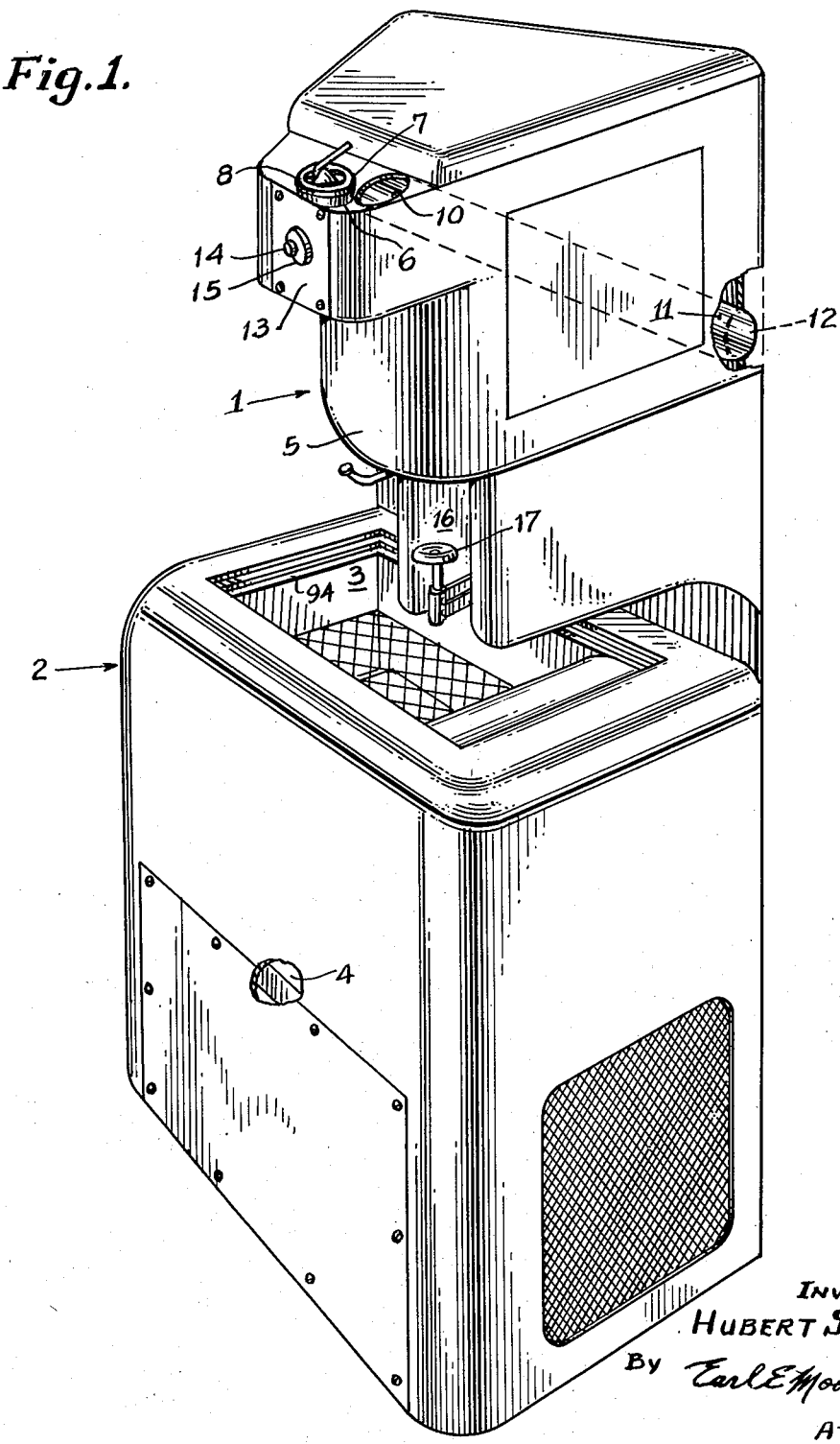
Figure 1 is a front perspective view of the invention with its streamlined cabinet and showing an upper portion where the pre-mixed flavors are frozen, a central operating and storage space where the different flavors are kept cooled in proper single order containers, and a lower portion which houses the refrigerating machinery and which is the general support for the entire device.

The particular device herein illustrated in order to show one form in which the invention can be practiced, has an upper section 1 where the premixed flavors are frozen and its associated parts including the receiver where the pre-mix foods are emptied into the freezer and the dispensing portion where the finished product is delivered, and the lower section 2 having the base compartment for housing the refrigerating machinery and a top section thereof in the form of a well or recessed part 3. The compartment for the machinery, that is, compressor and motor along with the condenser and associated parts is indicated at 4. The streamlined shell 5 indicates a coverall for the top section and has the opening 6 to accommodate the inlet hopper or receiver 7 and this hopper is provided with the hinged cover 8; this cover being so designed and hinged that it knocks away the empty pre-mix container 9 when it is closed, the empty container falling into the opening 10 of the chute 11 which conducts it to a rear opening 12 where the empty container falls into a suitable basket or trash container, not shown.

A closure plate 13 is provided which has a small hole to accommodate the stem 14 of the hand wheel 15. A vertically arranged and somewhat elongated open bottomed channel-like portion 16 is provided to accommodate the vertical reciprocable platten or platform 17 which receives the container 71 to be filled with the frozen mix which may be cream or a semi-frozen malt.

Figure 4:
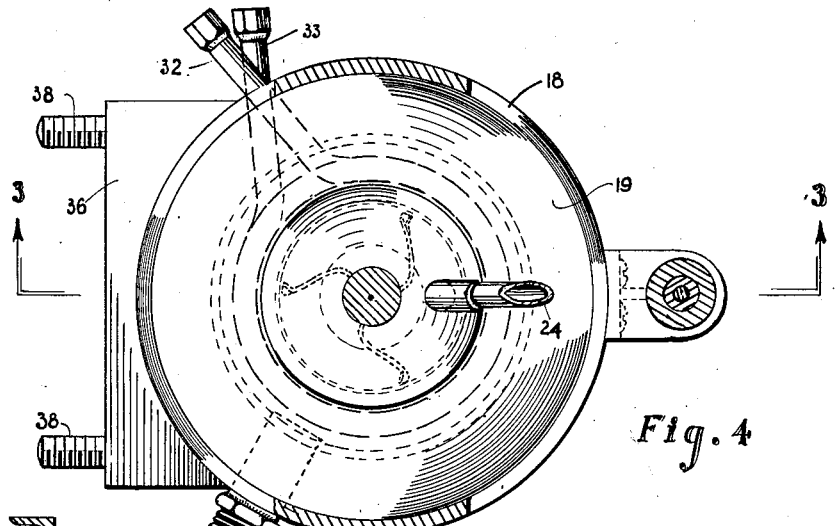
Figure 4 is a horizontal portion taken substantially along the line 4—4 of Fig. 3.
Figure 8:
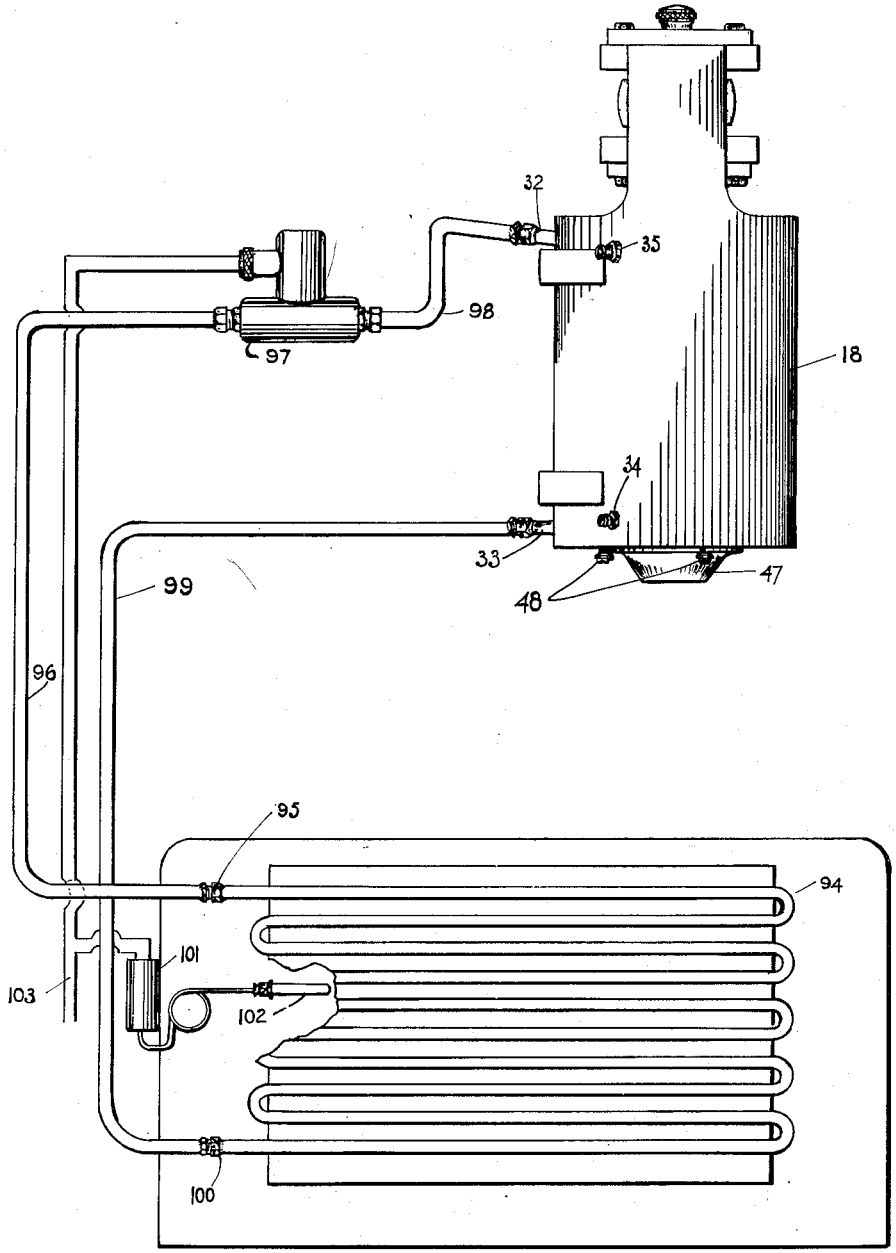
Figure 8 is a vertical view of the freezer and a portion of the container storage compartment showing the connections between them.

The freezer consists of a shell and shell-like evaporator and associated parts which will now be described in detail. This part of the illustrated form of the invention, has the outer cylindrical shell 18 with the top and bottom end plates 19 and 20 respectively. The end plates have central bores which snugly engage the ends of an inner cylindrical shell 21, the inner surface of which is highly polished so as to prevent frozen mix from sticking or adhering thereto. The bottom end of this inner shell is open, but the top end thereof is closed by a snug fitting cap 22 which is flanged, except that a central bore is provided therein having the sealing collar 23, and another bore to one side to snugly accommodate the lower end of the feed tube 24, as shown. Fixed to the underside of the top plate 19 there is a head plate 25 having a suitable opening to accommodate the inner shell, and a similar bottom plate 26 is provided in a recessed portion of the bottom end plate and the end portions (perimetrical portions) of the plates 25 and 26 which are sealed to the edges of the intermediate spaced cylindrical shell 27. Between the shells 18 and 27 there is space for ample and suitable insulating material 28, and between the shells 21 and 27 there is another circular space 29 which accommodates the secondary refrigerant coil 30 to be further explained later on. In this space 29 a primary refrigerant circulates and floods about two-thirds thereof and it is in intimate constant contact with the secondary refrigerant coils 30 and also with the inner shell 21 so as to maintain a predetermined low temperature in the freezer chamber 31. The inlet and outlet of the coils are indicated at 32 and 33, respectively, and the inlet and outlet for the flooded refrigerant chamber 29 are indicated at 34 and 35, respectively, see Fig. 2 and also Figs. 4 and 8.

Figure 2:
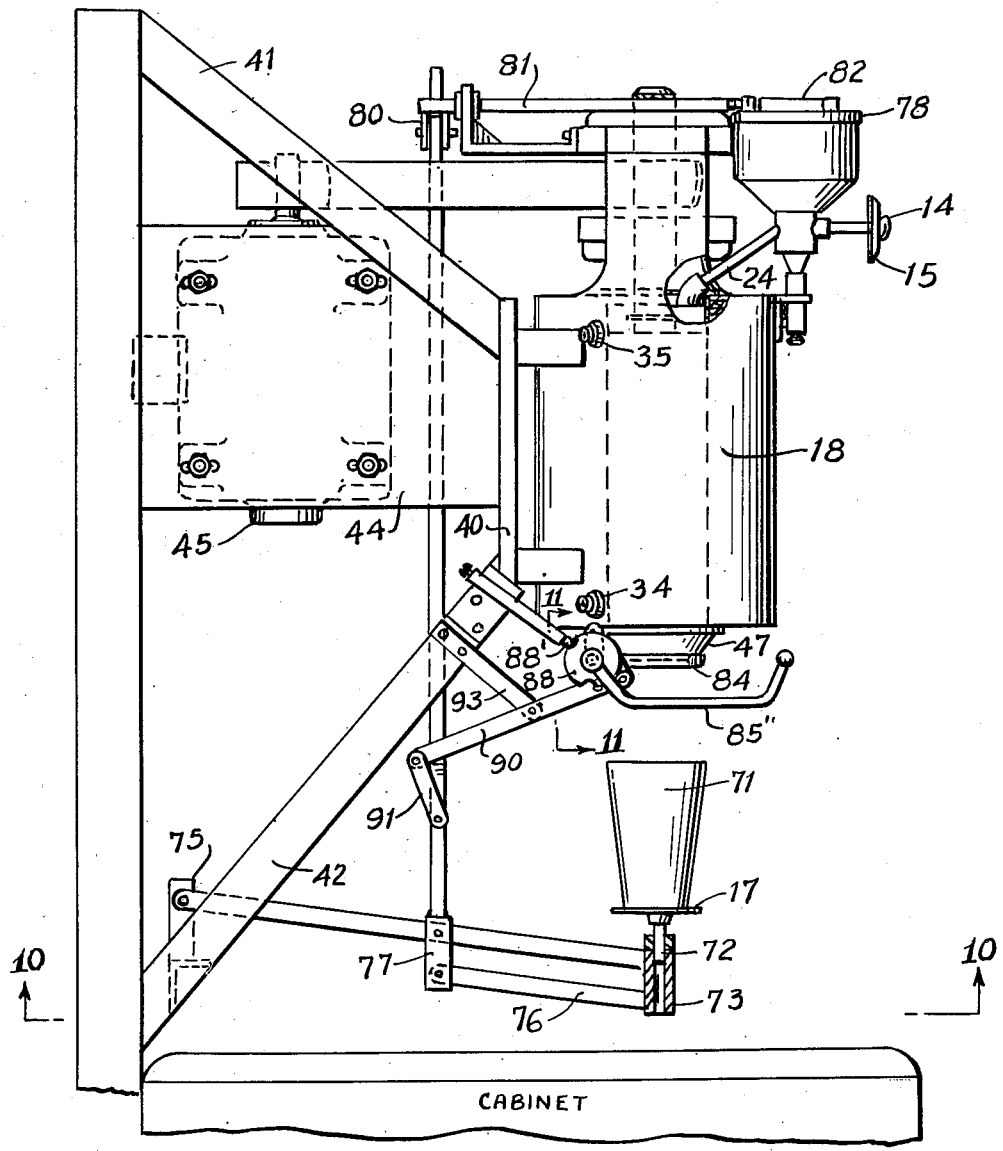
Figure 2 is a side elevational view, somewhat enlarged, upper cabinet portion removed, showing the freezing unit with the pre-mix receiver, and dispensing portions and associated parts.
Figure 9:
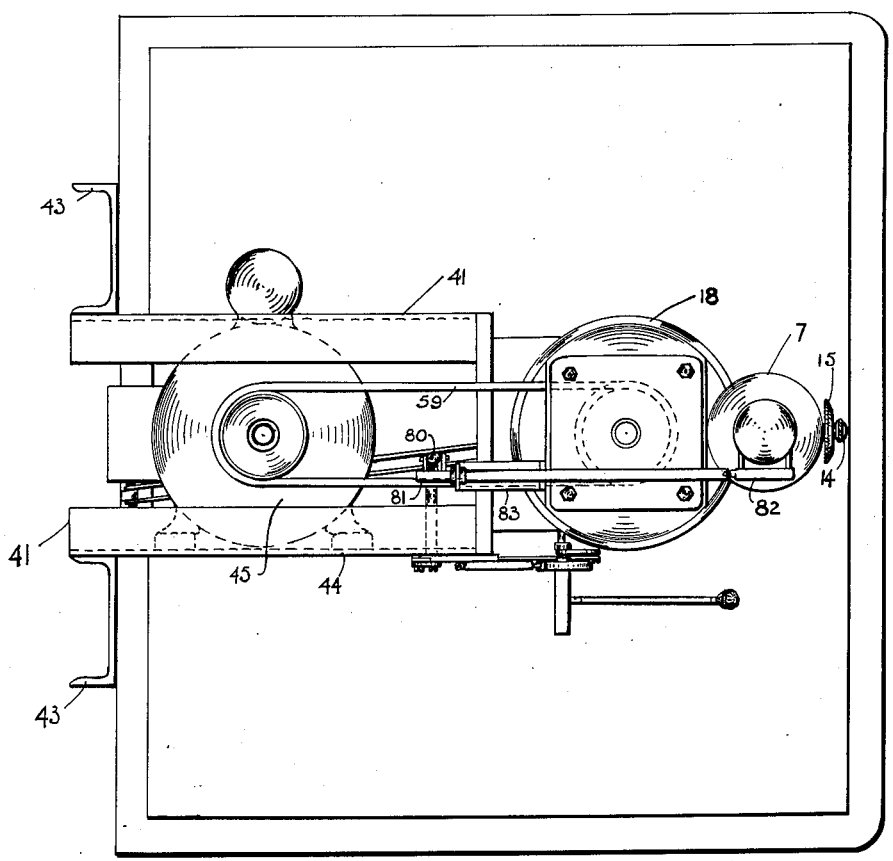
Figure 9 is a top plan view of the device showing the freezer electric motor drive, pre-mix receiver and linkages.

The freezer is supported through the bracket blocks 36 and 37 which are welded to the outer shell 18 and which blocks have the integral pair of threaded stems 38 and 39, respectively; these threaded stems being held to the bracket plate 40 and the plate 40 which is supported in turn by the plurality of bracket arms 41 and 42 and the other ends of these arms are firmly secured to the rear upright frame members indicated at 43, note Figs. 2 and 9. The frame and arms also support the plate 44 to which the electric motor 45 is bolted. The shaft of the motor has the belt pulley wheel 46 keyed thereto.

At the bottom end of the chamber 31, there is removably supported a feed or discharge spout of frusto-conical formation, the spout is indicated at 47 and sets of washers and screws 48 are provided which pass through bayonet locking slots in the marginal portions of the flange of the feed or discharge spout. Within the freezer chamber 31 there is a beater or dasher means 49 that is revolvable and this means will be explained in detail later; however, this beater has the taper-like shaft end portion 50' with the threaded bore 51 which receives the screw portion of the headed holding pin element 52. This pin 52 is a tension pin and securely holds the shaft end 50' in the flared opening of the collar 53 and this collar is keyed to the pulley 58; the cross-pin 54 connecting the collar and shaft end together for rotation. The outer races of the ball bearings 56 and 57 are fixed, as shown, the bottom one resting upon the head element 55. By this arrangement of parts, the driving belt 59 drives the pulley 58 which rotates the shaft 50 of the beater.

Figure 7:
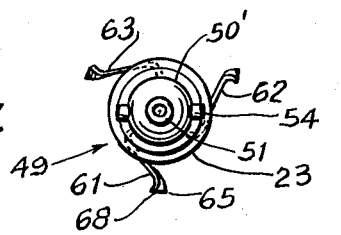
Figure 7 is a top plan view of that shown in Fig. 5.
Figure 5:
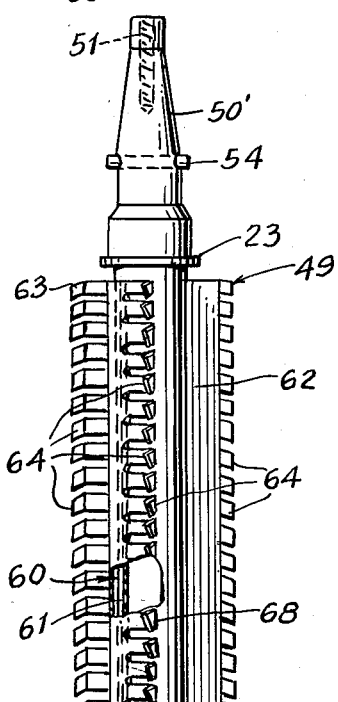
Figure 5 is a side elevational view of the beater, whipper or dasher employed in the freezer, a part thereof being broken away.
Figure 6:
Figure 6 is a bottom plan view of that shown in Fig. 5.
Figure 6:
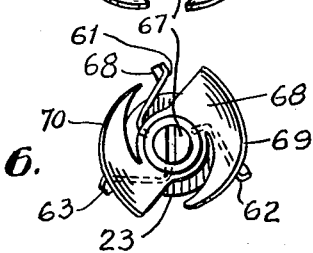

The beater 49 is shown best in Figs. 5, 6 and 7, and has its shaft 50 longitudinally slotted along its outer surface as indicated at 60, there being a plurality of equally spaced slots to accommodate a plurality of blade elements 61, 62 and 63, more or less blade elements may be employed. Each blade unit or element is made of a single sheet of resilient material and shaped as shown. Each blade element is provided with a plurality of evenly spaced and alined integral teeth or fingers 64 which have angled ends 65 and which are slightly swaged or twisted to form as shown in Figs. 5 and 7. These resilient teeth have keen scraping edges 66 which are adapted to constantly scrape the inner cold refrigerated surfaces of the inner shell 31 and keep it clean of mix, the alternate plates having their teeth so spaced that they are in staggered relationship and thus are capable of maintaining the entire surface clean at all times. These resilient teeth beat and maintain a constant pressure on the walls of the cylinder as they rapidly revolve around with the shaft 50.

The bolt 67 at the base of the beater shaft 50 securely holds an extruder blade means or unit 68 which has the curved and somewhat pointed wing-like feeder blades 69 and 70. The teeth 64 and their respective blade portions are so designed and arranged that they constantly feed the frozen or semi-frozen mix downwardly along the inner surface of the shell 31; and the body of descending mix is rapidly disintegrated and given its final outward feed by action of the blades 69 and 70 into the container 71 placed upon the platten or platform 17.

Figure 10:
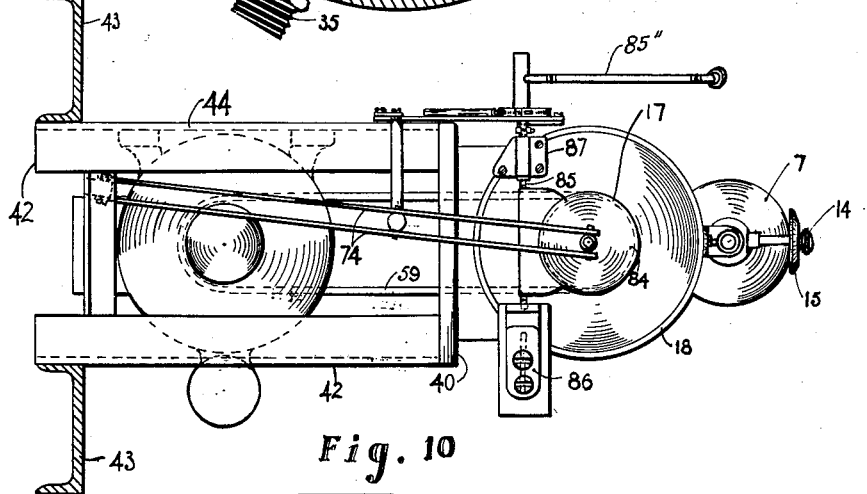
Figure 10 is an underview of a portion of the device taken substantially along the line 10—10 of Fig. 2.
Figure 11:
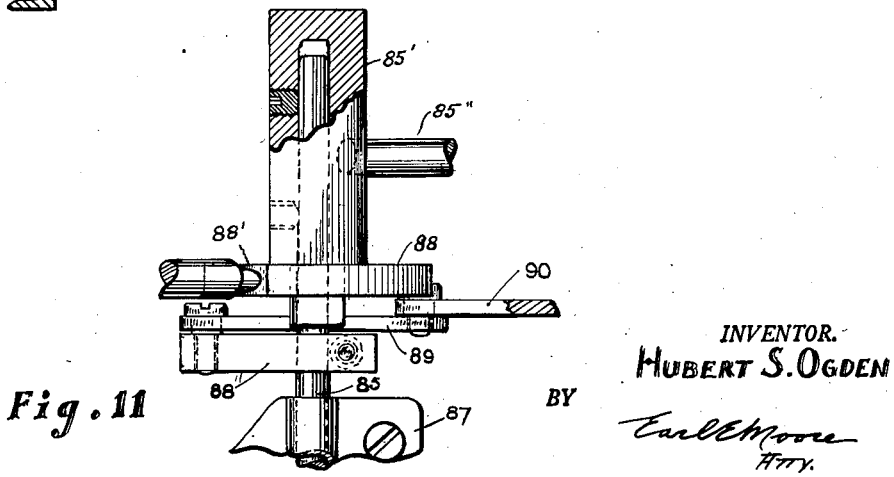
Figure 11 is a detailed part or parts shown partly in elevational view and partly in sectional view taken substantially along the line 11—11 of Fig. 2.

The underside of the platform 17 is fixed to the top of the adjustable pin 72 which is adjusted in the sleeve member 73 and fixed in position by a set screw. By means of cross-pins, the sleeve member 73 is pivoted to the pair of spaced top links 74 which are pivoted by means of cross-pin to the post 75. The sleeve member is also pivoted to the pair of shorter links 76 by cross-pin means, and both sets of links are pivoted by cross-pins to the vertical rod 78 at its lower end 77, as shown, and thus the platform 17 is supported in cantilever fashion and is vertically shiftable. The closure or door 84 is fixed to a rod 85, see Figs. 10 and 11, and this rod is journalled in the bearing members 86 and 87. One end of the rod has the sleeve 85' anchored thereto and from this sleeve extends the operating handle 85". Fixed to the rod 85 there is a holding disc 88 which has recessed portions into which falls a holding plunger element 88' so that the closure 84 can be held in open and closed positions. A short link 88" is fixed to the rod 85 and has its distal end pivoted to a link 90 at one end thereof, the link 90 being pivotly connected to the lower end of a bracket arm 93 which is fixed to the brace member 42. The other end of the link 90 is pivoted to one end of a shorter link 91 and this link is pivoted to the vertically shiftable rod 78 at 92.

The cover or closure 79 of the hopper 7 is fixed to a sleeve 82 which is fixed to 81 that is journalled in the bearing extending from the bracket means 83. The end of 81 is fixed to a U-shaped element 80 which is pivoted to the top portion of the vertically shiftable rod 78. When the handle 85" is rotated in one direction, the covers 84 and 79 are swung away from their respective openings by action of the rod 78, and the reverse occurs when the handle is swung in the opposite direction.

Figure 3:
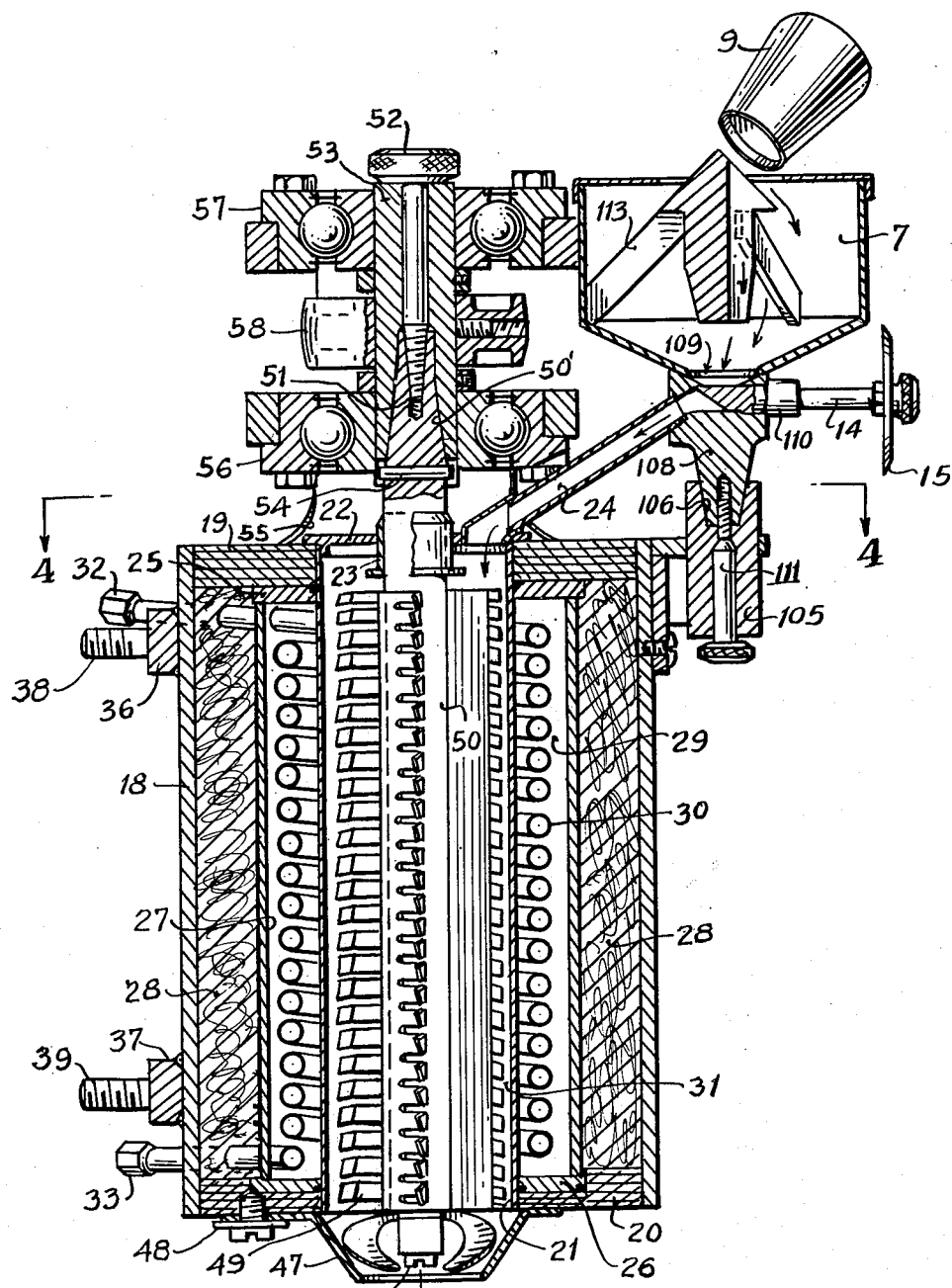
Figure 3 is an enlarged vertical sectional view of the freezer and its associated parts which is taken substantially along the line 3—3 of Fig. 4.

The hopper 7 and its associated parts are supported by the sleeve-like bracket means 105, see Fig. 3, and this bracket means has a bore with a tapered top portion 106 which receives the tapered base 107 of the valve unit 108. The hopper is fixed to and supported upon the valve unit and they both have the common passage 109 which directs the pre-mix fluid or semi-fluid into the tube 24. This passage is designed to neatly and snugly receive the valve head 110 which extends from the stem 14 and which stem has the manual operable wheel 15 so that the flow of the pre-mix can be regulated. For sanitary reasons, all the parts of the entire device can be easily and quickly removed and this is also true with the valve 108 and its hopper.

The valve base 108 has a threaded bore into which is screwed a retaining headed stem 111 which securely and firmly holds the assembly together. Within the hopper there is a piercing element 112 which has a sharp point for making an opening through the top wall of an inverted container, for instance, the container 9 shown in Fig. 3. This piercing element is upright and spaced from all the walls of the hopper by a spider arrangement consisting of a plurality of spaced apart bars or fins 113. The lower outlet of the feeder tube 24 is along the side wall of the cylinder 21, that is, along the curved line of motion of the ends of the resilient teeth or fingers of the whipping blades so that the entering mix is immediately divided and/or atomized for quick contact with the refrigerated wall of the freezing chamber.

Note that the very ends of the resilient teeth or fingers have their cutting and scraping edges 68 at an angle with respect to the vertical and that they are very effective for positively removing the quick frozen mix from the very low temperatured walls of the freezer. By having the resilient teeth instead of the continuous cutting edge of the entire blade, the shaft is not placed under any undue stress at any time and hence the predetermined speed of the whipping device or dasher is held constant and the likelihood of breakdowns materially minimized.

The containers of the mix which are to be emptied into the hopper 7 and their contents frozen or semi-frozen, are kept in the chamber 3 and this chamber is kept cold by the coil 94 of a secondary refrigerant system, that is, the coil 94 is an evaporator where the refrigerant is volatilized should such a refrigerant be employed. Obviously, a brine or other type of secondary refrigerant may be used which does not change its state from liquid to vapor and vice versa. The volatilized refrigerant passes from the coil 94 and thence through the pipe 96 which is coupled thereto at 95; and from this pipe the refrigerant in a vapor state enters the coil 30 at 32. This coil is in intimate contact with the body of primary refrigerant in chamber 31 which is cold enough to condense the secondary refrigerant which passes therefrom at 33 and enters the pipe 99 from which it passes into the bottom of coil 94 through coupling means 100. Thus an isolated thermo-syphon system is provided for keeping the storage chamber or well 3 cold. So that this chamber does not get too cold and thus prevent the mix from easily flowing from the containers 9, a thermostatic switch 101 is provided which allows or prevents electric current passing through the circuit 103. The temperature sensitive bulb 102 in the storage chamber is set at some predetermined pressure so as to operate the switch means 101 in accordance to the best practice in this art. The circuit 103 is connected to a suitable source of electric current supply, not shown, and the current in this circuit opens and/or closes the valve unit 97 so as to regulate automatically the chamber temperature in the well 3.

A float controlled flooded type evaporator is indicated at 29 and this chamber is kept about two-thirds full of refrigerant in liquid state and in which the coils 30 of the secondary system are bathed. The inlet 39 and outlet 38 of the primary system lead to a float control means, and to the usual and well known type of refrigerating machinery and parts such as the motor-compressor unit and condenser, not shown, but which are housed in the compartment 4 at the base of the device.

It is, of course, understood that various changes and modifications may be made in the details of form, style, design, and construction of the whole or any part of the specifically described embodiment of this invention without departing from the spirit thereof in that such changes and modifications are considered as being within the scope of the following claims.

I claim:

1. In a device for making frozen malts; a freezer unit having a suitable means of support, a freezing chamber within the unit having a vertical cylindrical wall which terminates at its bottom into a frusto-conical discharge opening, an agitator in chamber having blades shaped to remove frozen material from the wall and for feeding material to the discharge opening, means for freezing the chamber, a door pivoted to the discharge opening, a container support platform pivoted to the device for vertical movement, means for opening and closing the door by movement of the platform, a valved hopper means at the top of the chamber having a feed tube which conducts the material to be frozen directly into the top portion of the chamber.

2. In a device for making frozen malts and the like; a cylindrical central freezing chamber surrounded by refrigerating means and insulation, a frusto-conical feed means fixed to the bottom of the chamber, a bladed agitator in the chamber journalled for rotary action, a feed means fixed to the bottom end of the agitator and positioned in the feed means, an opening at the bottom of the feed means constituting an egress opening, a door pivoted to the device which normally closes the egress opening, a relatively small ingress opening at the top of the chamber adjacent the wall thereof, a hopper having valve means at the bottom thereof supported by the device, a feed tube connecting the valve means with the ingress opening, a sharp upstanding means within the hopper and spaced from the wall thereof for piercing the tops of inverted containers for allowing its contents to enter the hopper, pass through the valve means and enter the freezing chamber through the ingress opening, a reciprocable platform beneath the egress opening which is adapted to support the container to receive the frozen malt from the chamber, pivoted cantilever means supporting the platform from the device, linkage means connected with the cantilever means and the door for opening it when the platform is raised and for closing the door when the platform is lowered, and all the foregoing recited parts being easily removable for cleansing.

HUBERT S. OGDEN.

(References on following page)

REFERENCES CITED

The following references are of record in the file of this patent:

UNITED STATES PATENTS

| Number | Name | Date |
|---|---|---|
| 1,210,727 | Tyson | Jan. 2, 1917 |
| 2,056,432 | Light | Oct. 6, 1936 |
| 2,064,597 | Engelmann | Dec. 15, 1936 |
| 2,076,975 | Bach | Apr. 13, 1937 |
| 2,080,971 | Oltz | May 18, 1937 |
| 2,100,742 | Hartman | Nov. 30, 1937 |
| 2,191,344 | Erickson | Feb. 20, 1940 |
| 2,210,366 | Godfrey | Aug. 6, 1940 |
| 2,243,317 | Phelan | May 27, 1941 |
| 2,283,487 | Boileau | May 19, 1942 |
| 2,304,579 | Lindsay | Dec. 8, 1942 |